(12) United States Patent
Fuse

(10) Patent No.: US 7,050,199 B2
(45) Date of Patent: May 23, 2006

(54) IMAGE FORMING APPARATUS AND METHOD OF CONTROLLING THE APPARATUS

(75) Inventor: Hiroyuki Fuse, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 883 days.

(21) Appl. No.: 10/025,769

(22) Filed: Dec. 26, 2001

(65) Prior Publication Data

US 2003/0117674 A1    Jun. 26, 2003

(51) Int. Cl.
*B41B 15/00*    (2006.01)
(52) U.S. Cl. .................... 358/1.9; 358/3.2; 358/505
(58) Field of Classification Search ............... 358/1.9, 358/3.01, 3.26, 505, 509, 474, 475, 504
See application file for complete search history.

(56) References Cited

U.S. PATENT DOCUMENTS

| | | | | |
|---|---|---|---|---|
| 5,583,644 | A | * | 12/1996 | Sasanuma et al. .......... 358/296 |
| 5,825,939 | A | * | 10/1998 | Kawasaki et al. .......... 382/270 |
| 6,919,969 | B1 | * | 7/2005 | Takano et al. ............... 358/1.9 |
| 2002/0085217 | A1 | * | 7/2002 | Sakaue et al. ............... 358/1.9 |
| 2003/0067636 | A1 | * | 4/2003 | Kanno et al. ................ 358/504 |

FOREIGN PATENT DOCUMENTS

| | | |
|---|---|---|
| JP | 8-265520 | 10/1996 |
| JP | 8-279905 | 10/1996 |
| JP | 9-300698 | 11/1997 |

\* cited by examiner

*Primary Examiner*—Mark Wallerson
*Assistant Examiner*—Negussie Worku
(74) *Attorney, Agent, or Firm*—Foley & Lardner LLP

(57) ABSTRACT

The image data output from an image processing section 32 is corrected by a correcting section 33 and the corrected image data is input to a pulse width modulating section 34.

7 Claims, 10 Drawing Sheets

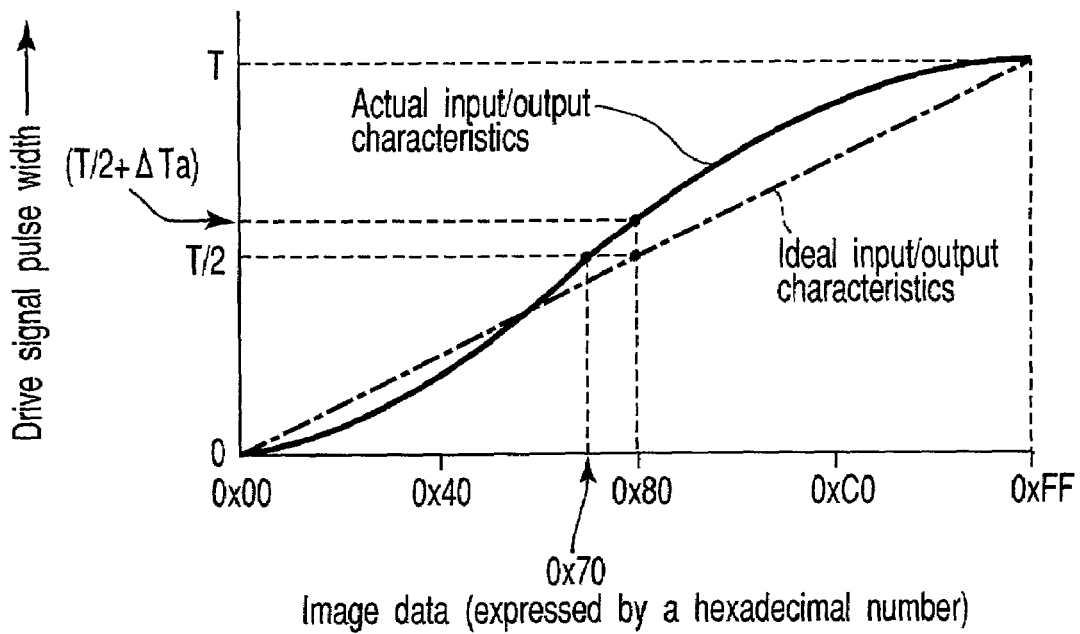
F I G. 4
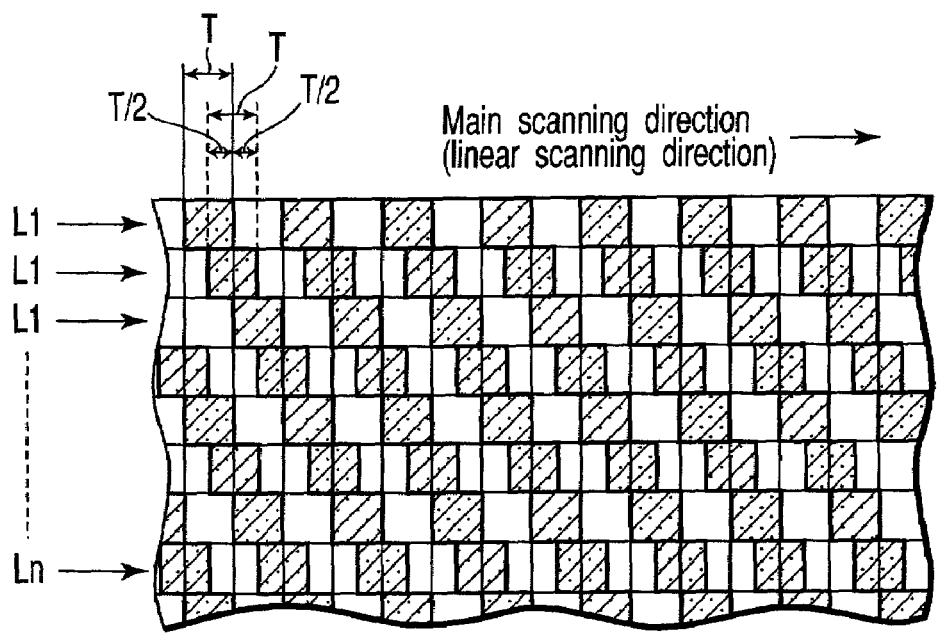
F I G. 6

| Image data (expressed by a hexadecimal number) | Corrected image data |
|---|---|
| 0x00 | 0x00 |
| ⋮ | ⋮ |
| 0x10 | 0x20 |
| ⋮ | ⋮ |
| 0x20 | 0x30 |
| ⋮ | ⋮ |
| 0x30 | 0x41 |
| ⋮ | ⋮ |
| 0x40 | 0x49 |
| ⋮ | ⋮ |
| 0x50 | 0x55 |
| ⋮ | ⋮ |
| 0x60 | 0x60 |
| ⋮ | ⋮ |
| 0x70 | 0x63 |
| ⋮ | ⋮ |
| 0x80 | 0x70 |
| ⋮ | ⋮ |
| 0x90 | 0x75 |
| ⋮ | ⋮ |
| 0xA0 | 0x82 |
| ⋮ | ⋮ |
| 0xB0 | 0x90 |
| ⋮ | ⋮ |
| 0xC0 | 0x99 |
| ⋮ | ⋮ |
| 0xD0 | 0xB8 |
| ⋮ | ⋮ |
| 0xE0 | 0xC0 |
| ⋮ | ⋮ |
| 0xF0 | 0xC8 |
| ⋮ | ⋮ |
| 0xFF | 0xFF |

FIG. 5

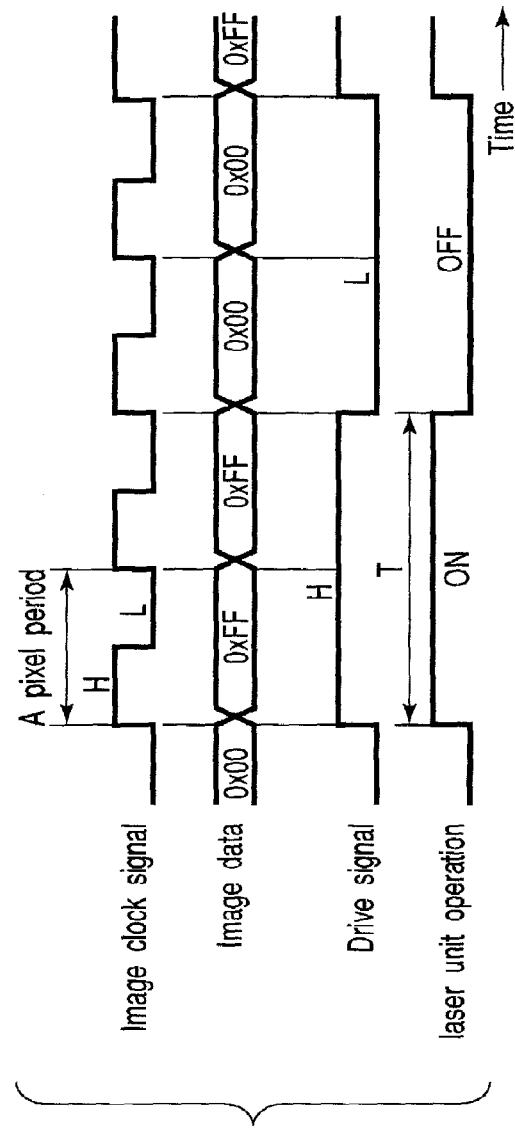
F I G. 16
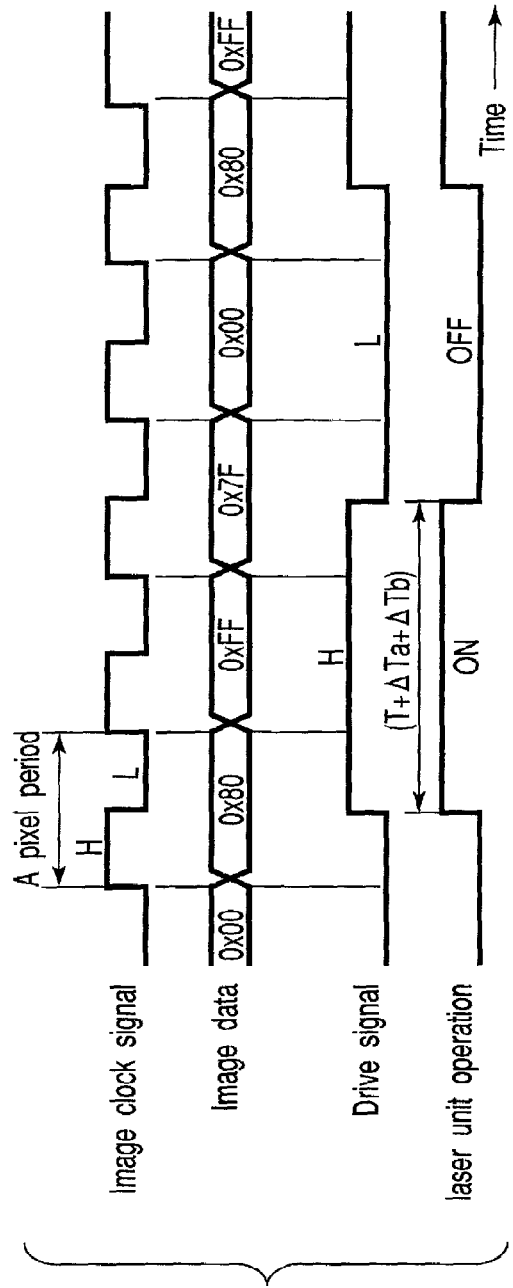
F I G. 17

IMAGE FORMING APPARATUS AND METHOD OF CONTROLLING THE APPARATUS

BACKGROUND OF THE INVENTION

When the print key of an image forming apparatus that may be a copying machine is depressed, the document set on the document table of the apparatus is irradiated with light and light reflected by the document is projected into the CCD (charge coupled device) of the apparatus. Then, an image signal (analog signal) showing a voltage level corresponding to the density of the projected image formed by the reflected light is output from the CCD.

The image signal output from the CCD is converted into a digital signal by means of an A/D converter to make image data, which is then supplied to an image processing section of the apparatus.

The image processing section appropriately processes the image data input to it and outputs the processed data. At the same time, it also outputs an image clock signal for synchronizing each of the pixels of the output image. The image data and the image clock signal are fed to a pulse width modulating section.

The pulse width modulating section performs a pulse width modulating operation corresponding to the image data. More specifically, a drive signal synchronized for one or more than one pixel of the image data and having a pulse width (high level period) corresponding to the density of the one or more than one pixel, whichever appropriate, is output from the pulse width modulating circuit. When the drive signal is at level High, the laser unit of the apparatus is energized to emit a laser beam.

The laser beam scans linearly the surface of a photosensitive drum along the axis direction of the drum. The linear scanning operation is repeated successively as the photosensitive drum is rotatedly driven. The direction in which the surface of the photosensitive drum is scanned linearly is referred to as a main scanning direction, whereas the direction in which the linear scanning is shifted as the rotation of the photosensitive drum is referred to as the sub scanning direction.

As the linear scanning operation of the laser beam is repeated, an electrostatic latent image corresponding to the document image is formed on the surface of the photosensitive drum. Then, the electrostatic latent image is developed by means of a development unit to produce a visible image. The produced visible image is transferred to a sheet of copying paper.

An IC circuit is typically used for the pulse width modulating section. The IC circuit shows input/output characteristics specific to it, which can adversely affect the quality of the image formed by the apparatus.

BRIEF SUMMARY OF THE INVENTION

Therefore, it is an object of the present invention to provide an image forming apparatus that is not affected by the input/output characteristics of the pulse width modulating section and can always form high quality images.

According to the present invention, the above object is achieved by providing an image forming apparatus comprising:

a scanning section which reads a document image and outputs image data representing the density of the read image for each pixel;

a pulse width modulating section which takes in as input the image data output from the scanning section and performs a pulse with modulating operation of generating and outputting a drive signal synchronized for one or more than one pixel of the image data and having a pulse width corresponding to the density of the one or more than one pixel, whichever appropriate;

a laser unit configured to be turned on and off according to the drive signal output from the pulse width modulating section and emit a laser beam during each on period;

a photosensitive drum;

a scanning section which linearly scans the surface of the photosensitive drum with the laser beam emitted from the laser unit along the axial direction of the photosensitive drum and repeating the linear scanning operation successively in synchronism with the rotation of the photosensitive drum;

a control section which shifts the number of pixels to be used for the pulse width modulating operation of the pulse width modulating section for each linear scanning operation of the scanning section; and a correcting section which corrects the image data output from the scanning section and input to the pulse width modulating section according to the input/output characteristics of the pulse width modulating section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitutes a part of the specification, illustrates presently preferred embodiments of the invention, and together with the general description given above and the detailed description of the preferred embodiments given below, serve to explain the principles of the invention.

FIG. 4 is graph illustrating the input/output characteristics of the pulse width modulating section of the embodiment;

FIG. 5 is a schematic illustration of the format of a corrected image data that is registered in a lookup table of the embodiment;

FIG. 6 is a schematic illustration of an image dot pattern that can be formed on the surface of the photosensitive drum of the embodiment;

FIG. 16 is a timing chart for the operation of pulse width modulation of two pixels in an operation of forming the image dot pattern of FIG. 15; and FIG. 17 is a timing chart for the operation of pulse width modulation of three pixels in an operation of forming the image dot pattern of FIG. 15.

DETAILED DESCRIPTION OF THE INVENTION

Now, the present invention will be described by referring to the accompanying drawing that illustrates a preferred embodiment of the invention.

Figure 1:
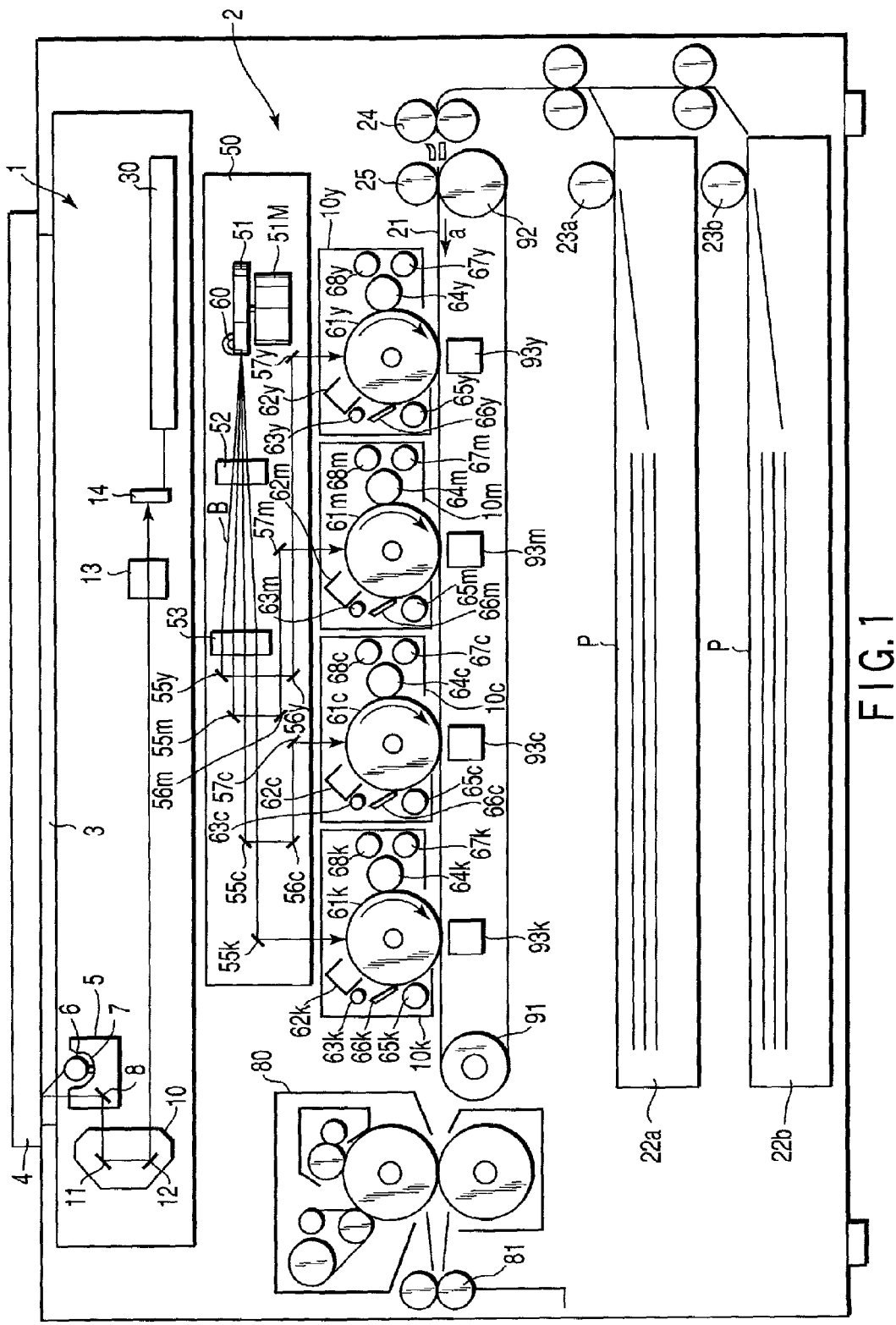
FIG. 1 is a schematic illustration of an embodiment of the invention.

FIG. 1 is a schematic illustration of the embodiment of image forming apparatus that is a digital color copying machine, showing the internal configuration thereof. The image forming apparatus comprises a scanning section 1 for reading a document image and outputting image data representing the density of the read image for each pixel and a 4-serial tandem type printing section 2 for forming a color image on a sheet of copying paper according to the image data output from the scanning section 1.

A document table (glass panel) 3 for setting a document is arranged on the scanning section 1. A document cover 4 is arranged on the document table 3 to cover the latter. It can be opened to access the document table 3.

A carriage 5 is arranged below the document table 3. It is provided with an exposure lamp 6, a reflector 7 and a mirror 8. The carriage 5 is adapted to be moved (reciprocatingly) along the lower surface of the document table 3. The document set on the document table 3 is exposed to light as the carriage 5 is driven to reciprocate along the document table 3 and the exposure lamp 6 is turned on. As a result of the exposure, an image is obtained from the light reflected by the document.

Thus, the carriage 5, the exposure lamp 6, the reflector 7 and the mirror 8 constitute an exposure unit for exposing the document set on the document table 3 to light.

The image carried by the light reflected from the document is projected into a CCD (charge coupled device) 14 by means of the mirror 8, mirrors 11, 12 arranged on the carriage 10 and a variable power lens block 13. The CCD 14 comprises a number of photoelectric converting elements in its light receiving region and is configured to output image signals representing respective voltage levels that correspond to the densities of the red, green and blue images respectively obtained out of the received image produced by the reflected light. The image signals are fed to a control unit 30.

The printing section 2 includes image forming sections 10y, 10m, 10c, 10k that are arranged side by side. A conveyor belt 21 for conveying a sheet of copying paper P, which will be described hereinafter, is arranged under the image forming sections 10y, 10m, 10c, 10k. The conveyor belt 21 extends between a drive roller 91 and a follower roller 92 and driven to move at a constant rate.

The image forming sections 10y, 10m, 10c, 10k have respective photosensitive drums 61y, 61m, 61c, 61k. The axes of rotation of these photosensitive drums 61y, 61m, 61c, 61k extend perpendicularly relative to the running direction of the conveyor belt 21.

Charging units 62y, 62m, 62c, 62k, development rollers 64y, 64m, 64c, 64k, toner stirring rollers 67y, 67m, 67c, 67k, toner stirring rollers 68y, 68m, 68c, 68k, transfer units 93y, 93m, 93c, 93k, waste toner collection screws 65y, 65m, 65c, 65k, cleaning blades 66y, 66m, 66c, 66k and discharging units 63y, 63m, 63c, 63k are sequentially arranged around the respective photosensitive drums 61y, 61m, 61c, 61k.

Cassettes 22a, 22b are arranged below the conveyor belt 21. The cassettes 22a, 22b contains respective sheets of copying paper P of different sizes. As the print key of the apparatus is turned on, sheets of copying paper P are taken out one by one from either of the cassettes 22a, 22b. The cassettes 22a, 22b are provided with respective pickup rollers 23a, 23b for taking out sheets of printing paper P.

The sheets of copying paper P taken out from either of the cassettes 22a, 22b are sent to a registering roller 24. The registering roller 24 sends a sheet of copying paper P to the start point of the conveyor belt 21 at timing good for cooperating with the rotating photosensitive drum 61y. An adsorption roller 25 is arranged at the start point in order to provide the sheet of copying paper P with electrostatic adsorptive force.

The sheet of copying paper P sent to the start point of the conveyor belt 21 is then moved to the photosensitive drum 61y. A yellow visible image is formed on the surface of the photosensitive drum 61y immediately before the arrival of the sheet of copying paper P so that the visible image is transferred onto the sheet of copying paper P.

The sheet of copying paper P is then moved from the photosensitive drum 61y to the photosensitive drum 61m. A magenta visible image is formed on the surface of the photosensitive drum 61m immediately before the arrival of the sheet of copying paper P so that the visible image is transferred onto the sheet of copying paper P.

The sheet of copying paper P is then moved from the photosensitive drum 61m to the photosensitive drum 61c. A cyan visible image is formed on the surface of the photosensitive drum 61c immediately before the arrival of the sheet of copying paper P so that the visible image is transferred onto the sheet of copying paper P.

Then, the sheet of copying paper P is moved from the photosensitive drum 61c to the photosensitive drum 61k. A black visible image is formed on the surface of the photosensitive drum 61k immediately before the arrival of the sheet of copying paper P so that the visible image is transferred onto the sheet of copying paper P.

Thereafter, the sheet of copying paper P is moved from the photosensitive drum 61k to fixing unit 80. The fixing unit 80 fixes the visible images transferred onto the sheet of copying paper P. Then, the sheet of copying paper P is delivered from the fixing unit 80 to the outside of the apparatus main body by a delivery roller 81.

On the other hand, a printing engine 50 is arranged above the image forming sections 10y, 10m, 10c, 10k. The printing engine 50 has a laser unit (e.g., a semiconductor laser oscillator) 60 adapted to emit laser beams.

The laser unit 60 is operated by the drive signal fed from the control unit 30 and sequentially emits a laser beam B for a yellow image, a laser beam B for a magentan image, a laser beam B for a cyan image and a laser beam B for a black image.

Figures 2, 3:
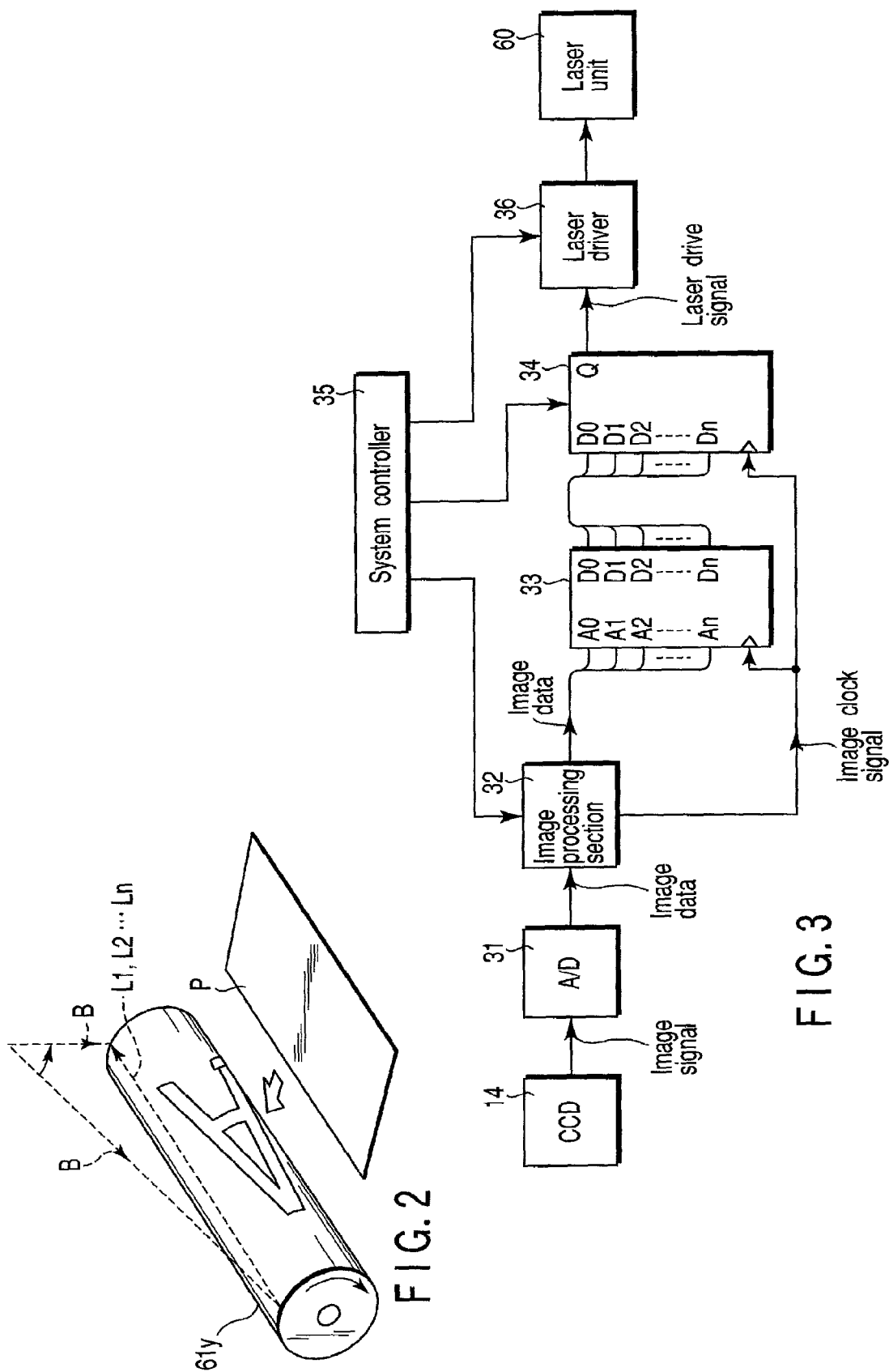
FIG. 2 is a schematic illustration of the photosensitive drum of the embodiment, showing the linear scanning operation of a laser beam.
FIG. 3 is a schematic block diagram of a principal part of the control circuit of the embodiment.

The laser beam B for a yellow image emitted from the laser unit 60 is made to irradiate the surface of the photosensitive drum 61$y$ by way of polygon mirror 51, lenses 52, 53 and mirrors 55$y$, 56$y$, 57$y$. The polygon mirror 51 is rotatedly driven by motor 51M. As a result of the rotary motion, the laser beam B swings in the axial direction of the photosensitive drum 61$y$. Then, as a result of the swinging motion of the laser beam B, as shown in FIG. 2, the surface of the photosensitive drum 61$y$ is linearly scanned by the laser beam in the axial direction of the photosensitive drum 61$y$ and the linear scanning operation is repeated successively as the photosensitive drum 61$y$ is rotatedly driven (linear scanning L1, L2, . . . Ln). In this way, an electrostatic latent image corresponding to the yellow image is formed on the surface of the photosensitive drum 61$y$. The electrostatic latent image is developed by the development roller 64$y$ to become a visible image.

The direction in which the surface of the photosensitive drum 61$y$ is scanned linearly is referred to as the main scanning direction, whereas the direction in which the linear scanning is shifted as the rotation of the photosensitive drum 61$y$ is referred to as the sub scanning direction.

The laser beam B for a magentan image emitted from the laser unit 60 is made to irradiate the surface of the photosensitive drum 61$m$ by way of polygon mirror 51, lenses 52, 53 and mirrors 55$m$, 56$m$, 57$m$. As a result of the swinging motion of the laser beam B, the surface of the photosensitive drum 61$m$ is linearly scanned by the laser beam in the axial direction of the photosensitive drum 61$m$ and the linear scanning operation is repeated successively as the photosensitive drum 61$m$ is rotatedly driven. In this way, an electrostatic latent image corresponding to the magentan image is formed on the surface of the photosensitive drum 61$m$. The electrostatic latent image is developed by the development roller 64$m$ to become a visible image.

The laser beam B for a cyan image emitted from the laser unit 60 is made to irradiate the surface of the photosensitive drum 61$c$ by way of polygon mirror 51, lenses 52, 53 and mirrors 55$c$, 56$c$, 57$c$. As a result of the swinging motion of the laser beam B, the surface of the photosensitive drum 61$c$ is linearly scanned by the laser beam in the axial direction of the photosensitive drum 61$c$ and the linear scanning operation is repeated successively as the photosensitive drum 61$c$ is rotatedly driven. In this way, an electrostatic latent image corresponding to the cyan image is formed on the surface of the photosensitive drum 61$c$. The electrostatic latent image is developed by the development roller 64$c$ to become a visible image.

The laser beam B for a black image emitted from the laser unit 60 is made to irradiate the surface of the photosensitive drum 61$k$ by way of polygon mirror 51, lenses 52, 53 and mirror 55$k$. As a result of the swinging motion of the laser beam B, the surface of the photosensitive drum 61$k$ is linearly scanned by the laser beam in the axial direction of the photosensitive drum 61$k$ and the linear scanning operation is repeated successively as the photosensitive drum 61$k$ is rotatedly driven. In this way, an electrostatic latent image corresponding to the black image is formed on the surface of the photosensitive drum 61$k$. The electrostatic latent image is developed by the development roller 64$k$ to become a visible image.

The scanning section for scanning the photosensitive drums 61$y$, 61$m$, 61$c$, 61$k$ with laser beams B is constituted by the polygon mirror 51, the lenses 52, 53 and the mirrors.

FIG. 3 is a schematic illustration of a principal part of the control unit 30.

The image signal output from the CCD 14 is converted into a digital signal by A/D converter 31 to make image data R showing the density of the red image, image data G showing the density of the green image and image data B showing the density of the blue image B. These image data R, G, B are fed to the image processing section 32.

The image processing section 32 processes the image data R, G, B fed from the A/D conversion unit 31 and outputs image data Y showing the density of the yellow image to be produced, image data M showing the density of the magentan image to be produced, image data C showing the density of the cyan image to be produced and also image data K showing the density of the black image to be produced along with image clock signals to be used for synchronizing each of the pixels of the output images. The image data Y, M, C, K and the image clock signals are supplied to the pulse width modulating section 34 by way of the correcting section 33.

The pulse width modulating section 34 performs a pulse width modulating operation according to the input image data and referring to the image clock signals. More specifically, it generates and outputs a drive signal synchronized for one or more than one of pixels of the image data and having a pulse width (high level period) corresponding to the density of the one or more than one pixels, whichever appropriate.

Particularly, the pulse width modulating section 34 selectively performs a pulse width modulating operation of generating and outputting a drive signal with a pulse width corresponding to the density of a single pixel in synchronism with each of the pixels of the input image data, a pulse width modulating operation of generating and outputting a drive signal with a pulse width corresponding to the density of two pixels in synchronism with every two of the pixels of the input image data or a pulse width modulating operation of generating and outputting a drive signal with a pulse width corresponding to the density of three or more than three pixels in synchronism with every three or more than three of the pixels of the input image data according to the instruction from the system controller 35 as the control section.

The system controller 35 controls the overall operation of the image forming apparatus and comprises a control means as described in (1) below as principal functional feature relating to the pulse width modulating section 34.

(1) a control means for selecting two of the pulse width modulating operation for a single pixel, the pulse width modulating operation for two pixels and the pulse width modulating operation for three pixels, in accordance with which one of the image data Y, M, C, K has been output from the image processing section 32 and for causing the pulse width modulating section 34 to carried out the selected two pulse width modulating operations alternately for the operation of linear scanning on the photosensitive drum on a line-by-line bases.

The drive signal output from the pulse width modulating circuit 34 is fed to the laser driver 35. The laser driver 35 turns on the laser unit 60 when the drive signal comes to level HIGH and turns off the laser unit 60 when the drive signal comes to level LOW.

FIG. 4 is graph illustrating the actual input/output characteristics of the pulse width modulating section 34 of the embodiment in comparison with ideal input/output characteristics. More specifically, when image data "0×80 (hexadecimal value)" is input to the pulse width modulating section 34, if the pulse width modulating section shows ideal input/output characteristics, it is expected to output a drive signal having a pulse width (high level period) exactly ½ corresponding to a pixel period T. However, in reality, it outputs a drive signal with a pulse width (high level period) of [T/2+ΔTa] because of its actual input/output characteristics. The term "0×" in the expression of "0×80 (hexadecimal value)" shows that it is a hexadecimal number.

The correcting section 33 corrects the image data input to the pulse width modulating section 34 so that the drive signal that is output from the pulse width modulating section 34 in response to the corresponding input of image data to the pulse width modulating section 34 may be same as the imaginary output of a pulse width modulating section 34 showing predetermined ideal input/output characteristics.

More specifically, the correcting section 33 comprises a lookup table as shown in FIG. 5 that stores image data input to the correcting section 33 and the corresponding corrected image data that is supposed to be output from the correcting section 33 and input to the pulse width modulating section 34.

For instance, as image data "0×00" is input to the correcting section 33, corresponding image data "0×00" that is already corrected is output from the correcting section 33. Similarly, as image data "0×10" is input to the correcting section 33, corresponding image data "0×20" that is already corrected is output from the correcting section 33. Likewise, as image data "0×20" is input to the correcting section 33, corresponding image data "0×30", whichever appropriate, that is already corrected is output from the correcting section 33.

FIG. 6 is a schematic illustration of an image dot pattern that can be formed on the surface of the photosensitive drum 61y as a result of the operation of turning on/off the laser unit 60.

Figure 7:
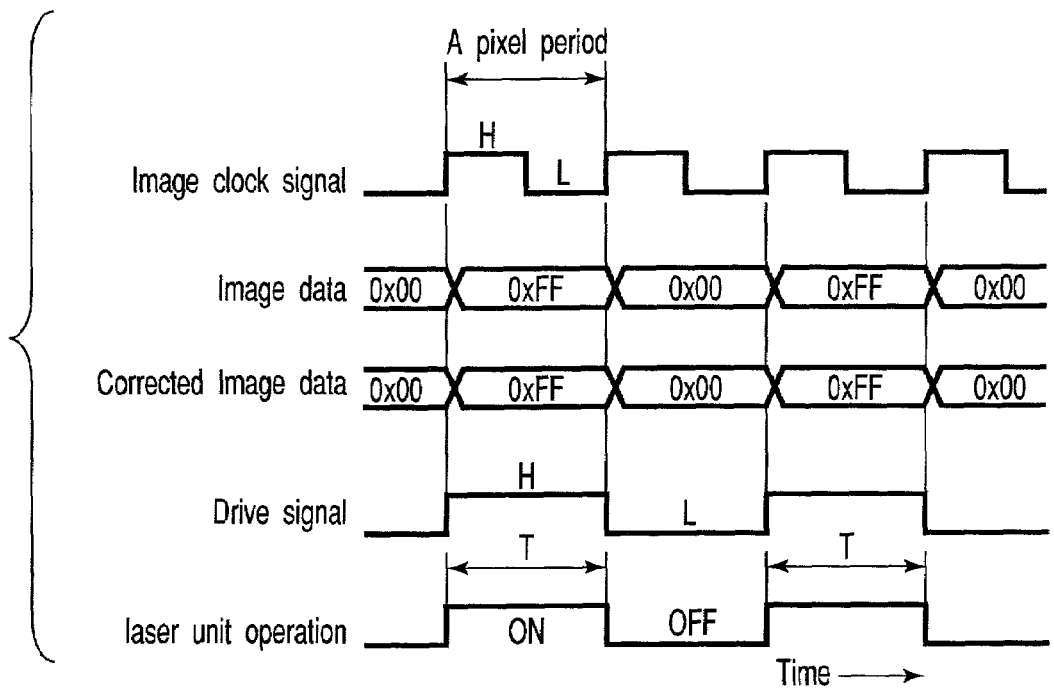
FIG. 7 is a timing chart for the operation of pulse width modulation of a single pixel in an operation of forming the image dot pattern of FIG. 6.

On scanning lines L1, L3, . . . , a pulse width modulating operation is conducted for each and every pulse as shown in FIG. 7 so that an image dot having a width corresponding to a pixel period T is formed in synchronism for each pixel.

Figure 8:
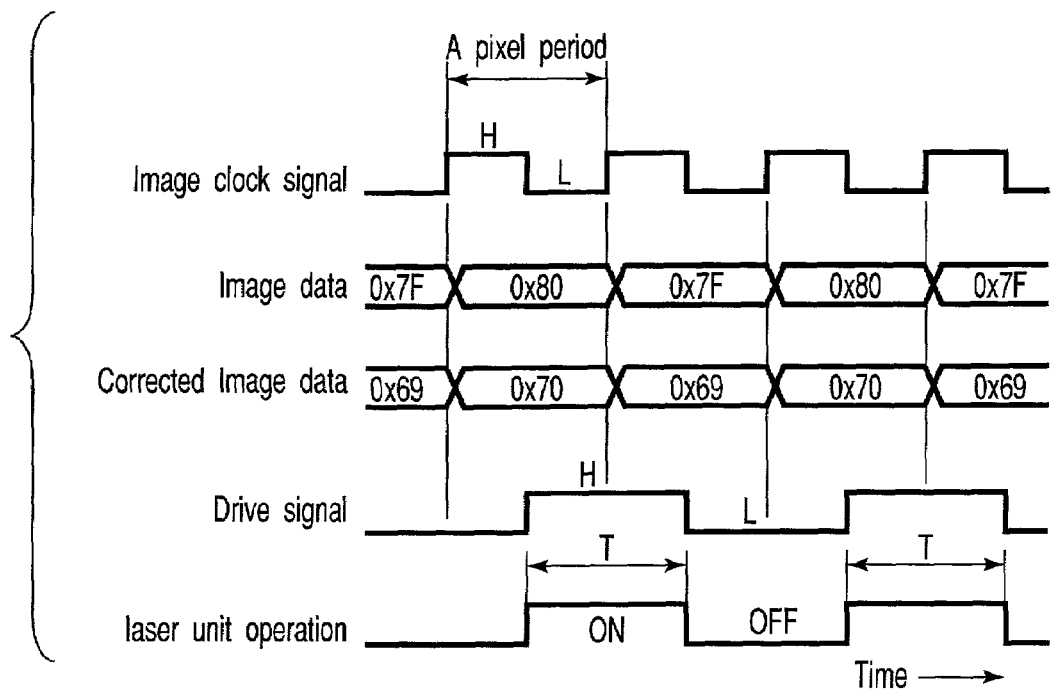
FIG. 8 is a timing chart for the operation of pulse width modulation of two pixels in an operation of forming the image dot pattern of FIG. 6.

On the other hand, on scanning lines L2, L4, . . . , a pulse width modulating operation is conducted for every two pulses as shown in FIG. 8 so that an image dot having a width corresponding to a pixel period T is formed in synchronism for every two pixels. It will be seen from FIG. 8 that the pulse (high level period) of the drive signal is displaced to the rear end of first the pixel period of the two pixel periods that are used as reference for synchronization, whereas the pulse (high level period) of the drive signal is displaced to the front end of the second pixel period. An image dot having a width corresponding to a pixel period T is formed as a result of the combination of the pulse of the first pixel and that of the second pixel.

In this way, a pulse width modulating operation for each and every pixel and a pulse width modulating operation for every two pixels are carried out alternately on a scanning line by scanning line basis to transfer the image dots of the yellow image onto the sheet of copying paper P in such a way that the image dots are arranged obliquely at a specific angle. Because of the oblique arrangement of image dots at a specific angle, a clear yellow image is formed on the sheet of copying paper P.

Particularly, as the image data output from the image processing section 32 is corrected by the correcting section 33 and the corrected image data is input to the pulse width modulating section 34, each image dot on the scanning lines L1, L3, . . . and each image dot on the scanning lines L2, L4, . . . are made to show a desired width. In other words, a high quality image is formed without being influenced by the input/output characteristics of the pulse width modulating section 34.

The image dot pattern of FIG. 6 is formed by using image dots having a same and identical width. In reality, the image dot width may vary from image dot to image dot depending on the density of the image read out from the document.

Figure 9:
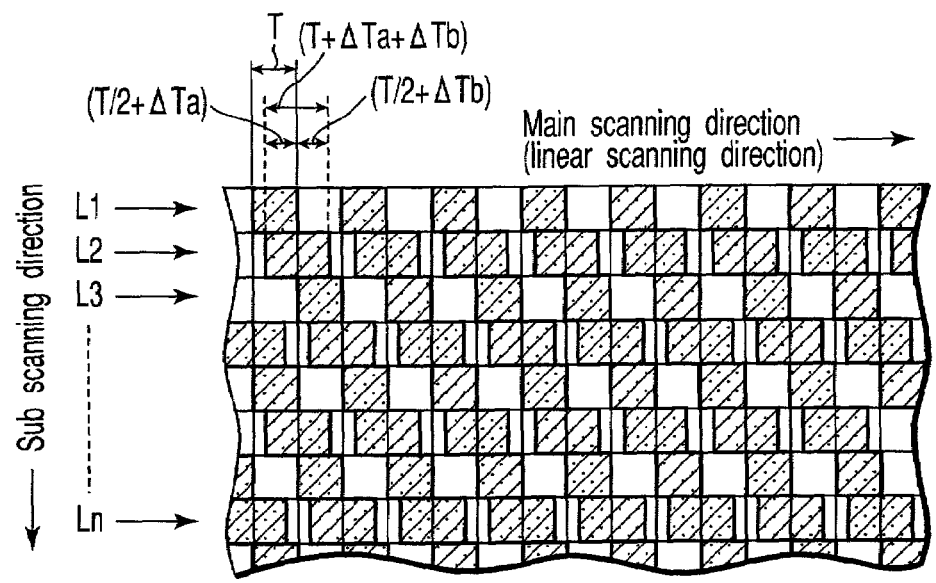
FIG. 9 is a reference illustration of a defective dot pattern that can be formed on the surface of the photosensitive drum.

If the correcting section 33 is not provided, an image dot pattern as shown in FIG. 9 may be formed on the surface of the photosensitive drum 61y. Referring to FIG. 9, a pulse width modulating operation for each and every pixel is conducted on scanning lines L1, L3, . . . as shown in FIG. 10 and a pulse width modulating operation for every two pixels is conducted on scanning lines L2, L4, . . . as shown in FIG. 11.

Figure 10:
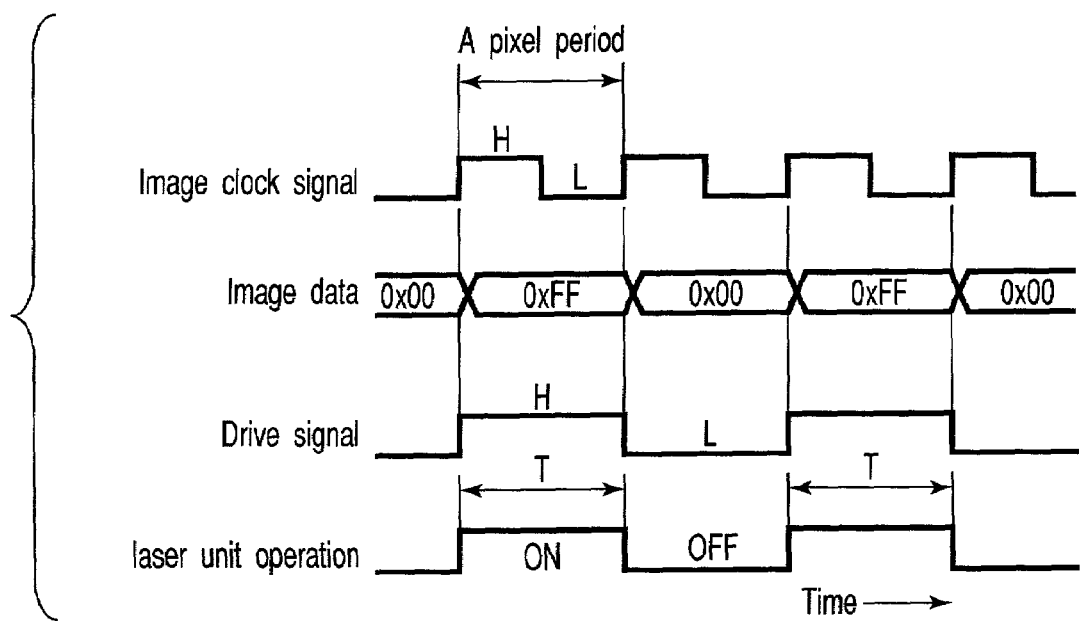
FIG. 10 is a timing chart for the operation of pulse width modulation of a single pixel in an operation of forming the image dot pattern of FIG. 9.
Figure 11:
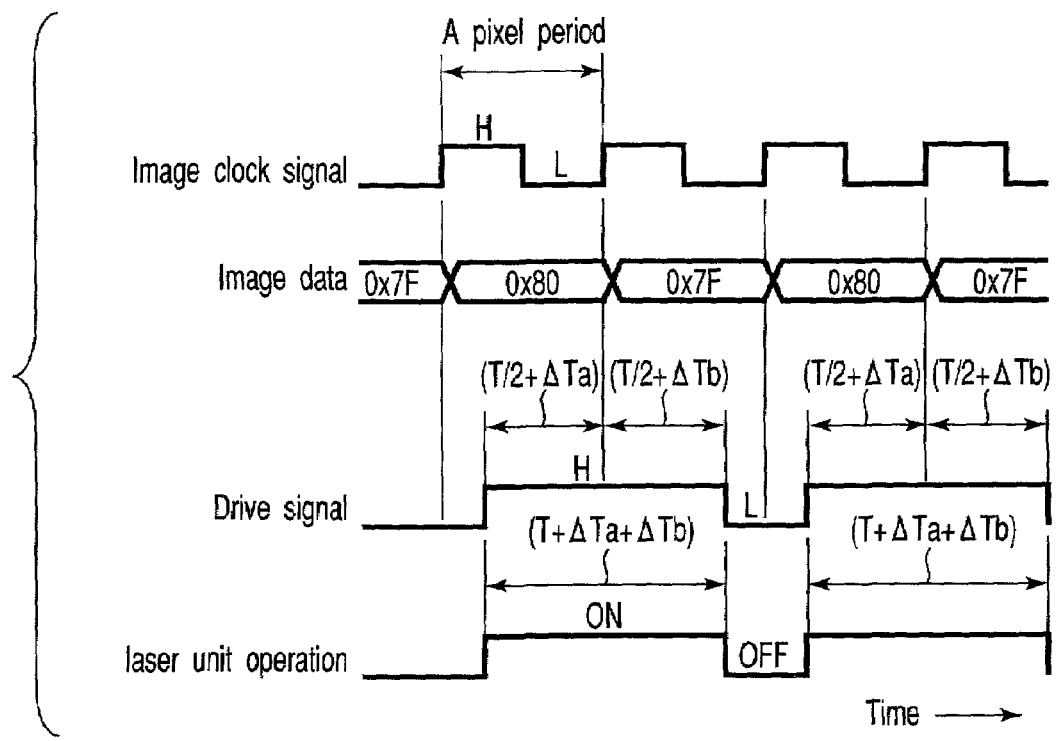
FIG. 11 is a timing chart for the operation of pulse width modulation of two pixels in an operation of forming the image dot pattern of FIG. 9.

It will be appreciated from FIGS. 9 through 11 that each image dot on scanning lines L1, L3, . . . , shows a width equal to a pixel period T, whereas each image dot on scanning lines L2, L4, . . . , shows a width (=T+ΔTa+ΔTb) that is greater than a pixel period T. Thus, it is not possible to make each image dot have a desired width and a defective image dot pattern is produced.

The lines of image dots formed on the surface of the photosensitive drum are made to show an optimal angle that varies from color to color. The angle is appropriately selected as a function of the number of pixels that are processed by the pulse width modulating section 34 for pulse width modulation.

Figure 12:
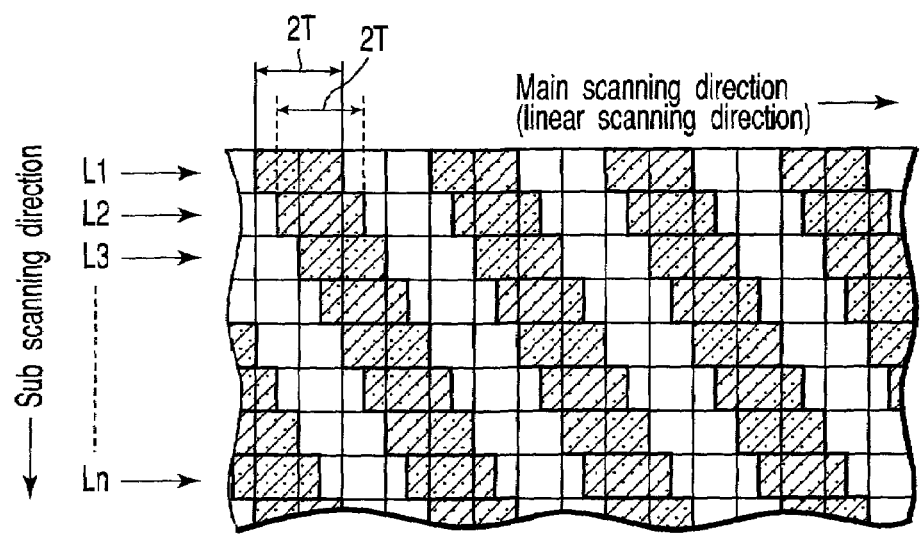
FIG. 12 is a schematic illustration of another image dot pattern that can be formed on the surface of the photosensitive drum of the embodiment.

FIG. 12 is a schematic illustration of an image dot pattern in cyan that can be formed on the surface of the photosensitive drum 61c of the embodiment.

Figure 13:
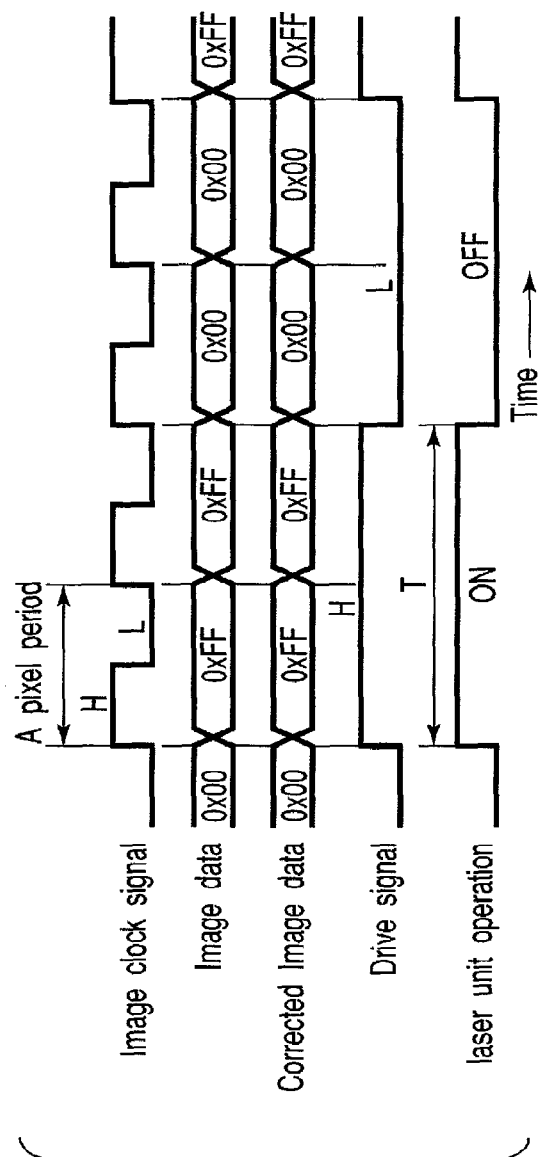
FIG. 13 is a timing chart for the operation of pulse width modulation of two pixels in an operation of forming the image dot pattern of FIG. 12.

A pulse width modulating operation for every two pixels is conducted on scanning lines L1, L3, . . . as shown in FIG. 13 so that image dots having a width corresponding twice of a pixel period T are formed in synchronism for every two pixels.

Figure 14:
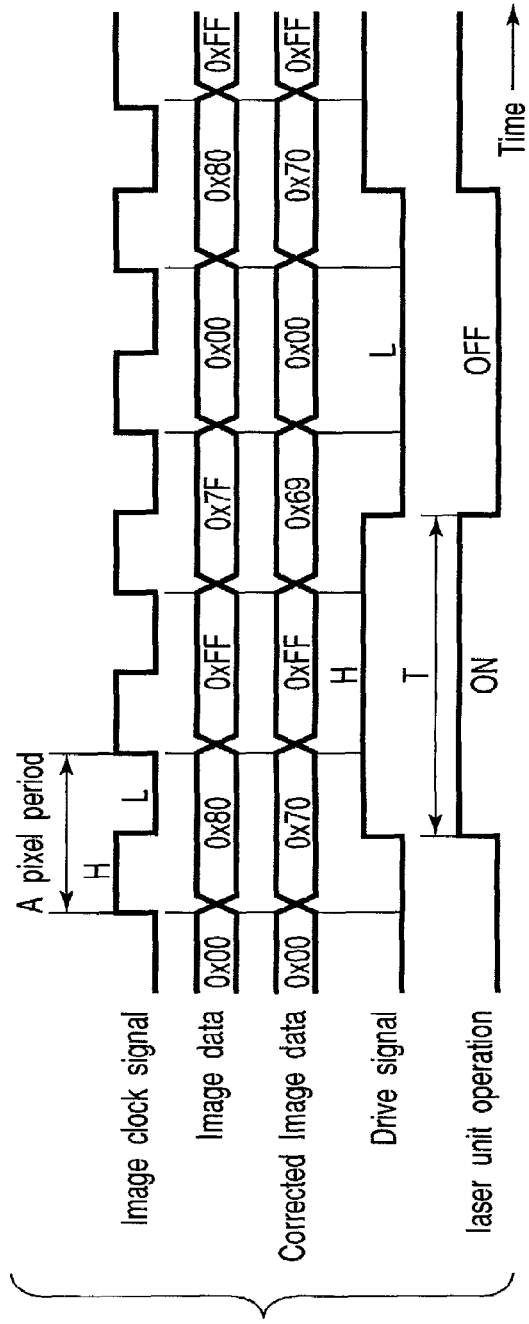
FIG. 14 is a timing chart for the operation of pulse width modulation of three pixels in an operation of forming the image dot pattern of FIG. 12.

A pulse width modulating operation for every three pixels is conducted on scanning lines L2, L4, . . . as shown in FIG. 14 so that image dots having a width corresponding twice of a pixel period T are formed in synchronism for every three pixels. It will be appreciated that the pulse (high level period) of the drive signal is displaced to the rear end of first the pixel period of the three pixel periods that are used as reference for synchronization, while the pulse (high level period) of the drive signal corresponds to the entire period of second the pixel period and the pulse (high level period) of the drive signal is displaced to the front end of the third pixel period. An image dot having a width corresponding to twice of a pixel period T is formed as a result of the combination of the pulse of the first pixel, that of the second pixel and that of the third pixel.

In this way, a pulse width modulating operation for every two pixels and a pulse width modulating operation for every three pixels are carried out alternately on a scanning line by scanning line basis to transfer the image dots of the cyan image onto the sheet of copying paper P in such a way that the image dots are arranged obliquely at a specific angle. Because of the oblique arrangement of image dots at a specific angle, a clear cyan image is formed on the sheet of copying paper P.

Particularly, as the image data output from the image processing section 32 is corrected by the correcting section 33 and the corrected image data is input to the pulse width modulating section 34, each image dot on the scanning lines L1, L3, . . . and each image dot on the scanning lines L2, L4, . . . are made to show a desired width. In other words, a high quality image is formed without being influenced by the input/output characteristics of the pulse width modulating section 34.

The image dot pattern of FIG. 12 is formed by using image dots having a same and identical width. In reality, the image dot width may vary from image dot to image dot depending on the density of the image read out from the document.

Figure 15:
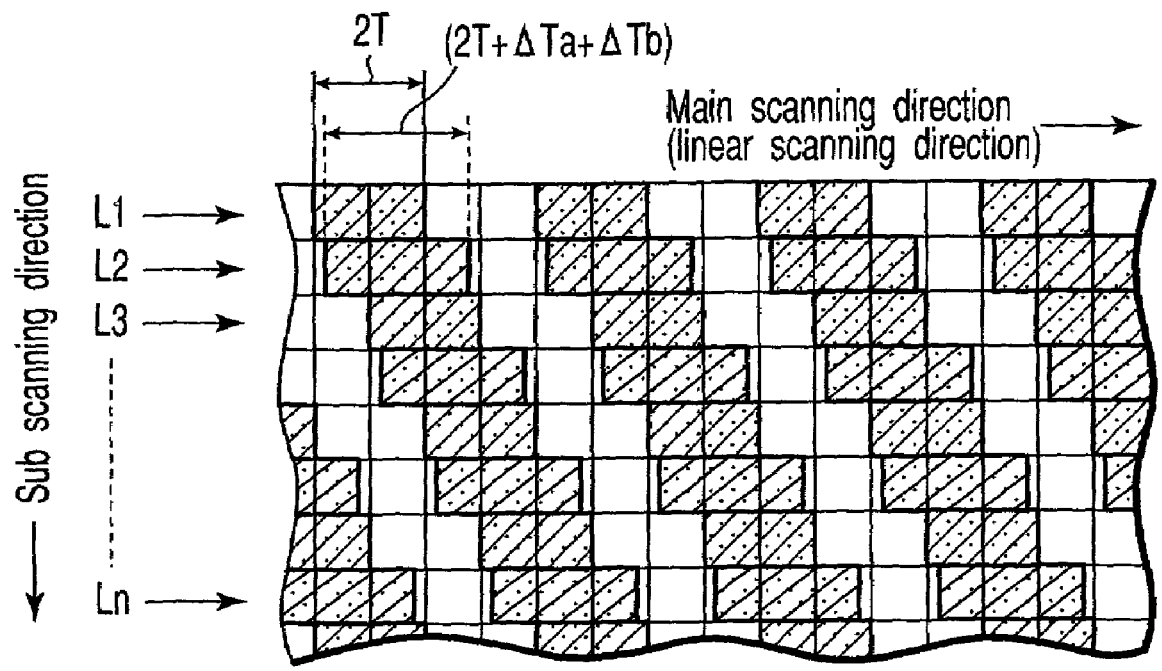
FIG. 15 is a reference illustration of another defective dot pattern that can be formed on the surface of the photosensitive drum.

If the correcting section 33 is not provided, an image dot pattern as shown in FIG. 15 may be formed on the surface of the photosensitive drum 61c. Referring to FIG. 15, a pulse width modulating operation for every two pixels is conducted on scanning lines L1, L3, . . . as shown in FIG. 16 and a pulse width modulating operation for every three pixels is conducted on scanning lines L2, L4, . . . as shown in FIG. 17.

It will be appreciated from FIGS. 14 through 16 that each image dot on scanning lines L1, L3, . . . , shows a width equal to twice of a pixel period T, whereas each image dot on scanning lines L2, L4, . . . , shows a width (=2T+ΔTa+ΔTb) that is greater than twice of a pixel period T. Thus, it is not possible to make each image dot have a desired width and a defective image dot pattern is produced.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. An image forming apparatus comprising:
a scanning section which reads a document image and outputs image data representing the density of the read image for each pixel;
a pulse width modulating section which takes in as input the image data output from said scanning section and performs a pulse width modulating operation of generating and outputting a drive signal synchronized for one or more than one pixel of the image data and having a pulse width corresponding to the density of the one or more than one pixel, whichever appropriate;
a laser unit configured to be turned on and off according to the drive signal output from said pulse width modulating section and emit a laser beam during each on period;
a photosensitive drum;
a scanning section which linearly scans the surface of said photosensitive drum with the laser beam emitted from said laser unit along the axial direction of the photosensitive drum and repeats the linear scanning operation successively in synchronism with the rotation of said photosensitive drum;
a control section which shifts the number of pixels to be used for the pulse-width modulating operation of said pulse width modulating section for each linear scanning operation of said scanning section; and
a correcting section which corrects the image data output from said scanning section and input to said pulse width modulating section according to the input/output characteristics of the pulse width modulating section,
where in said scanning section comprises:
a document table configured to set a document;
an exposure unit configured to expose the document set on said document table to light;
a photoelectric conversion element configured to receive the image formed by the light reflected from the document table and output an image signal showing a voltage level corresponding to the density of the red image, an image signal showing a voltage level corresponding to the density of the green image and an image signal showing a voltage level corresponding to the density of the blue image out of the received image formed by the reflected light;
an A/D conversion unit configured to perform A/D conversion on each of the image signals output from said photoelectric conversion element and output image data R showing the density of the red image, image data G showing the density of the green image and image data B showing the density of the blue image; and
an image processing section configured to process the image data R, G, B output from said A/D conversion unit and output image data Y showing the density of the yellow image, image data M showing the density of the magenta image, image data C showing the density of the cyan image and image data K showing the density of the black image,
wherein said pulse width modulating section selectively performs a pulse width modulating operation of generating and outputting a drive signal with a pulse width corresponding to the density of a single pixel in synchronism with each of the pixels of the input image data, a pulse width modulating operation of generating and outputting a drive signal with a pulse width corresponding to the density of two pixels in synchronism with every two of the pixels of the input image data, or a pulse width modulating operation of generating and outputting a drive signal with a pulse width corresponding to the density of three or more than three pixels in synchronism with every three or more than three, whichever appropriate, of the pixels of the input image data,
wherein said control section selects two of the pulse width modulating operation for a single pixel, the pulse width modulating operation for two pixels, and the pulse width modulating operation for three or more than three pixels, in accordance with which one of the image data Y, M, C, K has been output from said image processing section and for causing the pulse width modulating section to carry out the selected two pulse width modulating operations alternately on a line-by-line basis for the linear scanning operation of said scanning section.

2. The apparatus according to claim 1, wherein said correcting section corrects the image data input to the pulse width modulating section so that the drive signal that is output from the pulse width modulating section in response to the corresponding input of image data to the pulse width modulating section may be same as the imaginary output of a pulse width modulating section showing predetermined ideal input/output characteristics.

3. The apparatus according to claim 1, wherein said correcting section comprises a lookup table that stores image data input to the correcting section and the corresponding corrected image data that is supposed to be output from the correcting section and input to the pulse width modulating section.

4. An image forming apparatus comprising:
    a scanning means for reading a document image and outputting image data representing the density of the read image for each pixel;
    a pulse width modulating means for taking in as input the image data output from said scanning means and performing a pulse width modulating operation of generating and outputting a drive signal synchronized for one or more than one pixel of the image data and having a pulse width corresponding to the density of the one or more than one pixel, whichever appropriate;
    a laser unit configured to be turned on and off according to the drive signal output from said pulse width modulating means and emit a laser beam during each on period;
    a photosensitive drum;
    a scanning means for linearly scanning the surface of said photosensitive drum with the laser beam emitted from said laser unit along the axial direction of the photosensitive drum and repeating the linear scanning operation successively in synchronism with the rotation of said photosensitive drum;
    a control means for shifting the number of pixels to be used for the pulse width modulating operation of said pulse width modulating means for each linear scanning operation of said scanning means; and
    a correcting means for correcting the image data output from said scanning means and input to said pulse width modulating means according to the input/output characteristics of the pulse width modulating means,
    wherein said scanning means comprises:
    a document table configured to set a document;
    an exposure unit configured to expose the document set on said document table to light;
    a photoelectric conversion element configured to receive the image formed by the light reflected from the document table and output an image signal showing a voltage level corresponding to the density of the red image, an image signal showing a voltage level corresponding to the density of the green image and an image signal showing a voltage level corresponding to the density of the blue image out of the received image formed by the reflected light;
    an A/D conversion unit configured to perform A/D conversion on each of the image signals output from said photoelectric conversion element and output image data R showing the density of the red image, image data G showing the density of the green image and image data B showing the density of the blue image; and
    an image processing means configured to process the image data R, G, B output from said A/D conversion unit and output image data Y showing the density of the yellow image, image data M showing the density of the magenta image, image data C showing the density of the cyan image and image data K showing the density of the black image,
    wherein said pulse width modulating means selectively performs a pulse width modulating operation of generating and outputting a drive signal with a pulse width corresponding to the density of a single pixel in synchronism with each of the pixels of the input image data, a pulse width modulating operation of generating and outputting a drive signal with a pulse width corresponding to the density of two pixels in synchronism with every two of the pixels of the input image data, or a pulse width modulating operation of generating and outputting a drive signal with a pulse width corresponding to the density of three or more than three pixels in synchronism with every three or more than three, whichever appropriate, of the pixels of the input image data,
    wherein said control means selects two of the pulse width modulating operation for a single pixel, the pulse width modulating operation for two pixels, and the pulse width modulating operation for three or more than three pixels, in accordance with which one of the image data Y, M, C, K has been output from said image processing means and for causing the pulse width modulating means to carry out the selected two pulse width modulating operations alternately on a line-by-line basis for the linear scanning operation of said scanning means.

5. The apparatus according to claim 4, wherein said correcting means corrects the image data input to the pulse width modulating means so that the drive signal that is output from the pulse width modulating means in response to the corresponding input of image data to the pulse width modulating means may be same as the imaginary output of a pulse width modulating means showing predetermined ideal input/output characteristics.

6. The apparatus according to claim 4, wherein said correcting means comprises a lookup table that stores image data input to the correcting means and the corresponding corrected image data that is supposed to be output from the correcting means and input to the pulse width modulating means.

7. A method of controlling an image forming apparatus, the image forming apparatus having:
    a scanning section which reads a document image and outputs image data representing the density of the read image for each pixel;
    a pulse width modulating section which takes in as input the image data output from said scanning section and performs a pulse width modulating operation of generating and outputting a drive signal synchronized for one or more than one pixel of the image data and having a pulse width corresponding to the density of the one or more than one pixel, whichever appropriate;
    a laser unit configured to be turned on and off according to the drive signal output from said pulse width modulating section and emit a laser beam during each on period;
    a photosensitive drum; and
    a scanning section which linearly scans the surface of said photosensitive drum with the laser beam emitted from said laser unit along the axial direction of the photosensitive drum and repeats the linear scanning operation successively in synchronism with the rotation of said photosensitive drum;
    said method comprising:
    shifting the number of pixels to be used for the pulse width modulating operation of said pulse width modulating section for each linear scanning operation of said scanning section;
    correcting the image data output from said scanning section and input to said pulse width modulating section according to the input/output characteristics of the pulse width modulating section;
    selectively performing a pulse width modulating operation of generating and outputting a drive signal with a pulse width corresponding to the density of a single pixel in synchronism with each of the pixels of the input image data, a pulse width modulating operation of generating and outputting a drive signal with a pulse width corresponding to the density of two pixels in synchronism with every two of the pixels of the input image data, or a pulse width modulating operation of generating and outputting a drive signal with a pulse width corresponding to the density of three or more than three pixels in synchronism with every three or more than three, whichever appropriate, of the pixels of the input image data; and selecting two of the pulse width modulating operation for a single pixel, the pulse width modulating operation for two pixels, and the pulse width modulating operation for three or more than three pixels and causes said pulse width modulating section to carried out the selected two pulse width modulating operations alternately, on a line-by-line basis, for the linear scanning operation of said scanning section.

* * * * *